United States Patent
Kim et al.

(10) Patent No.: US 12,515,188 B2
(45) Date of Patent: Jan. 6, 2026

(54) AUTOMATED MICROREACTOR FOR EFFECTIVE OPTIMIZATION OF HIGH-SPEED CHEMICAL REACTION, AND METHOD OF OPTIMIZING HIGH-SPEED CHEMICAL REACTION THEREFOR

(71) Applicant: POSTECH Research and Business Development Foundation, Pohang-si (KR)

(72) Inventors: Dong-Pyo Kim, Pohang-si (KR); Gwang-Noh Ahn, Pohang-si (KR)

(73) Assignee: POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 688 days.

(21) Appl. No.: 17/958,209

(22) Filed: Sep. 30, 2022

(65) Prior Publication Data

US 2023/0110331 A1 Apr. 13, 2023

(30) Foreign Application Priority Data

Oct. 8, 2021 (KR) .................. 10-2021-0133739
Apr. 28, 2022 (KR) .................. 10-2022-0052641
Aug. 22, 2022 (KR) .................. 10-2022-0104799

(51) Int. Cl.
*B01J 19/00* (2006.01)
*B01F 23/40* (2022.01)
(Continued)

(52) U.S. Cl.
CPC ......... *B01J 19/0093* (2013.01); *B01F 23/49* (2022.01); *B01F 33/3017* (2022.01);
(Continued)

(58) Field of Classification Search
CPC .......... B01F 23/00; B01F 23/40; B01F 23/49; B01F 33/00; B01F 33/30; B01F 33/301;
(Continued)

(56) References Cited

U.S. PATENT DOCUMENTS 7,789,967 B2* 9/2010 Classen ............... A47L 15/4418
134/29

FOREIGN PATENT DOCUMENTS

EP 3210667 A1 * 8/2017 .......... B01J 19/0093

* cited by examiner

*Primary Examiner* — Natasha E Young
(74) *Attorney, Agent, or Firm* — LEX IP MEISTER, PLLC

(57) ABSTRACT

Proposed are an automated microreactor for effective optimization of a high-speed chemical reaction, and a method of optimizing a high-speed chemical reaction using the same. The automated microreactor includes a raw material supply unit including a plurality of flow rate controllers that supply a plurality of raw materials and control flow rates of the plurality of raw materials, an intermediate reaction unit including a plurality of micromixers for intermediate that generate a first mixture and a plurality of tubular reactors for intermediate that generate an intermediate product, an intermediate reaction control unit including a valve member, and a product reaction unit including a product micromixer that produces a second mixture and producing a product, through which optimal synthesis conditions (optimal temperature, flow rate, reaction volume and organolithium reagent type) can be achieved to obtain the highest yield in a short time.

19 Claims, 12 Drawing Sheets

(51) Int. Cl.
*B01F 33/301* (2022.01)
*B01F 35/221* (2022.01)
*B01F 101/00* (2022.01)
*C07D 239/95* (2006.01)

(52) U.S. Cl.
CPC ...... *B01F 35/2211* (2022.01); *B01F 35/2215* (2022.01); *B01F 35/2217* (2022.01); *B01J 19/0033* (2013.01); *C07D 239/95* (2013.01); *B01F 2101/2204* (2022.01); *B01J 2219/00792* (2013.01); *B01J 2219/00889* (2013.01); *B01J 2219/00959* (2013.01); *B01J 2219/00961* (2013.01)

(58) Field of Classification Search
CPC ...... B01F 33/3017; B01F 35/00; B01F 35/20; B01F 35/22; B01F 35/221; B01F 35/2211; B01F 35/2215; B01F 35/2217; B01F 2101/00; B01F 2101/2204; B01J 19/00; B01J 19/0006; B01J 19/0033; B01J 19/0093; B01J 2219/00; B01J 2219/00781; B01J 2219/00788; B01J 2219/00792; B01J 2219/00889; B01J 2219/0095; B01J 2219/00952; B01J 2219/00954; B01J 2219/00959; B01J 2219/00961; C07D 239/00; C07D 239/70; C07D 239/72; C07D 239/95
See application file for complete search history.

AUTOMATED MICROREACTOR FOR EFFECTIVE OPTIMIZATION OF HIGH-SPEED CHEMICAL REACTION, AND METHOD OF OPTIMIZING HIGH-SPEED CHEMICAL REACTION THEREFOR

CROSS REFERENCE TO RELATED APPLICATION

The present application claims priority to Korean Patent Application No. 10-2021-0133739, filed Oct. 8, 2021, No. 10-2022-0052641, filed Apr. 28, 2022, and No. 10-2022-0104799, filed Aug. 22, 2022, the entire contents of which are incorporated herein for all purposes by this reference.

BACKGROUND OF THE DISCLOSURE

1. Field of the Disclosure

The present disclosure relates to an automated microreactor for effective optimization of a high-speed chemical reaction and a method of optimizing a high-speed chemical reaction using the same.

2. Description of the Related Art

Microreactors and flow technologies for chemical synthesis are becoming core technologies for synthesis of organic materials as well as pharmaceutical compounds. Microreactors can maximize the reaction efficiency of general organic synthesis based on rapid transfer of materials and heat due to a high surface-to-volume ratio. While the exiting batch reaction methods can thermodynamically stably synthesize compounds, microreactors enable kinetic control. In particular, precise retention time control enables control of highly-reactive organolithium intermediate products, which are unstable and have a short life span, and active pharmaceutical ingredients (API) are produced with the intermediate products of high-speed chemical reaction, which play a significant role in synthesis of organic materials. For this reason, microreactors have been of great interest.

Nevertheless, due to trial and error in exploring various reaction variables, including exceedingly short reaction times, microreactor-based methodologies of high-speed chemical reactions have not been widely used. Reaction intermediate products produced from high-speed chemical reactions each have different chemical reactivity and life span due to their inherent instability, so investigating the effects of reaction retention time and temperature to optimize selectivity and productivity requires an engineering understanding of synthetic chemistry as well as flow chemistry reaction systems. In addition, it is generally difficult for highly-skilled researchers to perform proper reactions in highly-reactive high-speed chemical reactions due to flammability and vulnerability to oxygen or humidity. Furthermore, it is time-consuming and expensive to find the optimal synthesis conditions since microreactors require precise individual performance of various combinations of reaction parameters.

SUMMARY OF THE INVENTION

Objectives of the present disclosure are to solve the above problems and to provide an automated microreactor capable of finding optimal synthesis conditions (high yield) within a short time and a method of optimizing a high-speed chemical reaction using the same.

According to the present disclosure, one aspect provides an automated microreactor, which includes a raw material supply unit, an intermediate reaction unit, an intermediate reaction control unit, and a product reaction unit. The raw material supply unit has a plurality of flow rate controllers configured to supply a plurality of raw materials having first, second, and third raw materials, respectively, and control each of the flow rates of the raw materials. The intermediate reaction unit has a plurality of micromixers for intermediate configured to generate a first mixture by mixing the first and second raw materials supplied from the raw material supply unit and a plurality of tubular reactors for intermediate configured to generate an intermediate product by causing a reaction of the first mixture. The intermediate reaction control unit has a valve member configured to control a length of the tubular reactor for intermediate and at least one type of the second raw material supplied. The product reaction unit configured to produce a product has a product micromixer configured to mix the intermediate product supplied from the intermediate reaction unit and the third raw material supplied from the raw material supply unit to produce a second mixture.

In addition, a reaction time of the first mixture may be controlled by the flow rates of the first and second raw materials controlled by the flow rate controllers and a reaction volume of the tubular reactor for intermediate controlled by the valve member.

In addition, the plurality of the micromixers for intermediate may include a first micromixer for intermediate, a second micromixer for intermediate, ..., an i-th micromixer for intermediate, ..., and an n-th micromixer for intermediate (n and i are each independently a natural number, and $1 \leq i \leq n$) and the plurality of tubular reactors for intermediate may include a first tubular reactor for intermediate, a second tubular reactor for intermediate, ..., an i-th tubular reactor for intermediate, ..., and an n-th tubular reactor for intermediate (n and i are each independently a natural number, and $1 \leq i \leq n$), wherein the n micromixers for intermediate and the n tubular reactors for intermediate may be alternately connected in series.

In addition, the reaction volume of the tubular reactor for intermediate may be controlled by arbitrarily selecting the i-th micromixer for intermediate to which the second raw material is to be supplied.

In addition, the second raw material may be supplied to the i-th micromixer for intermediate, and the second raw material supplied to the i-th micromixer for intermediate may be mixed with the first raw material in the i-th micromixer for intermediate to form the first mixture, and the first mixture reacts while passing through the reaction volume, thereby producing the intermediate product.

In addition, reaction volumes may include a volume of the i-th tubular reactor for intermediate, ..., and a volume of the n-th tubular reactor for intermediate.

In addition, the flow rate controllers may include the first, second, and third raw material flow rate controllers configured to control the flow rates of the first, second, and third raw materials, respectively.

In addition, the valve member may include a first valve, ..., an i-th valve, ..., and an n-th valve (n and i are each independently a natural number, and $1 \leq i \leq n$), wherein the n valves may be connected in parallel and respectively connected in series to the first micromixer for intermediate, ..., the i-th micromixer for intermediate, ..., and the n-th micromixer for intermediate. Each of the n valves may be connected in series to the second raw material flow rate controller, and each of the n valves may independently open and close to allow or block supply of the second raw material to each of the n micromixers for intermediate.

In addition, the second raw material may include a first second-raw material, ..., a j-th second-raw material, ..., and an m-th second-raw material (m and j are each independently a natural number, and 1≤j≤m), wherein the first to m-th second-raw materials may be different from each other, the second-raw material flow rate controller may include a first second-raw material flow rate controller, ..., a j-th second-raw material flow rate controller, ..., and an m-th second-raw material flow rate controller (m and j are each independently a natural number, and 1≤j≤m) that respectively controls the flow rates of the first to m-th second-raw materials, and the valve member may include a first valve, ..., a j-th valve, ..., and an m-th valve (m and j are each independently a natural number, and 1≤j≤m), wherein the m valves may be respectively connected in series to the first, ..., j-th, ..., and m-th second-raw material flow rate controllers. Each of the m valves may be connected in series to the intermediate reaction unit, and the m valves may independently open and close to allow or prevent that each of the m second-raw materials is supplied to the micromixer for intermediate.

In addition, the second raw material may include a first second-raw material, ..., a j-th second-raw material, ..., and an m-th second-raw material (m and j are each independently a natural number, and 1≤j≤m), wherein the first to m-th second-raw materials may be different from each other, the second-raw material flow rate controller may include a first second-raw material flow rate controller, ..., a j-th second-raw material flow rate controller, ..., and an m-th second-raw material flow rate controller (m and j are each independently a natural number, and 1≤j≤m) that respectively controls the flow fates of the first to m-th second-raw materials, and the valve member may further include a first valve, ..., a j-th valve, ..., and an m-th valve (m and j are each independently a natural number, and 1≤j≤m), wherein the m valves may be respectively connected in series to the first, ..., j-th, ..., and m-th second-raw material flow rate controllers. Each of the m valves may be connected in series to the n valves, and the m valves may each independently open and close to allow or prevent that each of the m second-raw materials is supplied to the micromixer for intermediate through each of the n valves.

In addition, the valve may be a solenoid valve.

In addition, the intermediate product may have a life span in a range of 1 millisecond to 100 seconds.

In addition, the micromixer for intermediate may have a T shape.

In addition, the microreactor may further include a temperature control unit configured to control a temperature of each of the intermediate reaction unit and the product reaction unit.

In addition, the temperature control unit may include a circulating water bath and a cooling chamber.

In addition, the temperature control unit may adjust the temperature of each of the intermediate reaction unit and the product reaction unit to any one temperature selected from in a range of −80° C. to 50° C.

In addition, the automated microreactor may further include an artificial intelligence unit configured to control each of the raw material supply unit, the intermediate reaction unit, the intermediate reaction control unit, the product reaction unit, and the temperature control unit.

In addition, the artificial intelligence unit may use a Bayesian optimization algorithm to derive optimized values of the reaction volume of the intermediate reaction unit, the flow rate of the raw material, the reaction temperature of the intermediate reaction unit, and the reaction temperature of the product reaction unit.

In addition, each of the first, second, and third flow rate controllers may include a syringe pump.

In addition, the second raw material may include at least one organolithium compound selected from the group consisting of n-butyllithium, sec-butyllithium, n-hexyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

In addition, the automated microreactor may further include an analyzing unit including an analyzer to analyze the product generated in the product reaction unit.

In addition, the analyzing unit may include any one device selected from the group consisting of Fourier-transform infrared spectroscopy (FT-IR), nuclear magnetic resonance spectroscopy (NMR), gas chromatography-mass spectrometry (GC-MS), liquid chromatography-mass spectrometry (LC-MS), and ultraviolet-visible spectroscopy (UV-Vis).

In addition, the automated microreactor may further include a pressure sensor configured to detect an increase in pressure level.

In addition, the automated microreactor may be for use in a high-speed chemical reaction.

In addition, the automated microreactor may be used to derive optimal conditions for a reaction between the first and second raw materials.

According to the present disclosure, another aspect provides a method of optimizing a high-speed chemical reaction using an automated microreactor including a raw material supply unit, an intermediate reaction unit, an intermediate reaction control unit, and a product reaction unit. The method includes (a) controlling a flow rate of each of a plurality of raw materials including first, second, and third raw materials using a plurality of flow rate controllers of the raw material supply unit, respectively and supplying the plurality of the raw materials at the controlled flow rates, (b) producing a first mixture by mixing the first and second raw materials supplied from the raw material supply unit in any one of a plurality of micromixers for intermediate of the intermediate reaction unit, and producing an intermediate product by causing a reaction of the first mixture in at least one of a plurality of tubular reactors for intermediate, and (c) producing a second mixture by mixing the intermediate product supplied from the intermediate reaction unit and the third raw material supplied from the raw material supply unit in a product micromixer of the product reaction unit, and preparing a product, wherein a valve member of the intermediate reaction control unit controls a length of the tubular reactor for intermediate and at least one type of multiple types of the second raw material being supplied.

In addition, the optimization of the high-speed chemical reaction is a method of controlling a reaction time of the first mixture by controlling the flow rates of the first and second raw materials controlled with the flow rate controller and a reaction volume of the tubular reactor for intermediate with the valve member.

In addition, the automated microreactor may further include a temperature control unit and an artificial intelligence unit. The temperature control unit controls a temperature of each of the intermediate reaction unit and the product reaction unit, and the artificial intelligence unit controls each of the raw material supply unit, the intermediate reaction unit, the intermediate reaction control unit, the product reaction unit, and the temperature control unit.

In addition, the artificial intelligence unit may use a Bayesian optimization algorithm to derive optimized values of a reaction volume of the intermediate reaction unit, a flow rate of the raw material, a reaction temperature of the intermediate reaction unit, and a reaction temperature of the product reaction unit.

According to the automated microreactor and the method of optimizing the high-speed chemical reaction using the same of the present disclosure, optimal synthesis conditions (high yield) may be found in a short time.

BRIEF DESCRIPTION OF THE DRAWINGS

These drawings are for the purpose of describing exemplary embodiments of the present disclosure, and therefore the technical idea of the present disclosure should not be construed as being limited to the accompanying drawings.

DESCRIPTION OF THE PREFERRED EMBODIMENTS

Hereinafter, embodiments of the present disclosure will be described in detail with reference to the accompanying drawings so that those skilled in the art can easily carry out the present disclosure. However, the following description does not limit the present disclosure to specific embodiments. In the following description of the present disclosure, the detailed description of related arts will be omitted if it is determined that the gist of the present disclosure may be blurred. Terms used in the specification are used only to describe specific embodiments and are not intended to limit the present disclosure. The singular expression includes the plural expression unless the context clearly indicates otherwise. It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. In addition, terms used in the specification, "first", "second", etc., may be used to describe various components, but the components are not to be construed as being limited to the terms. These terms are used only for the purpose of distinguishing a component from another component. For example, without departing from the scope of the present disclosure, a first component may be referred as a second component, and a second component may be also referred to as a first component. In addition, when a component is referred to as being "formed" or "laminated" on another component, it may be formed directly or attached to the front or one surface on the surface of the other component, but it will be understood that intervening elements may be present therebetween.

Hereinafter, embodiments of an automated microreactor for effective optimization of a high-speed chemical reaction and a method of optimizing a high-speed chemical reaction using the same will be described in detail. However, it should be understood that the present disclosure is not limited thereto, and the present disclosure is only defined by the scope of the following claims.

Figure 1:
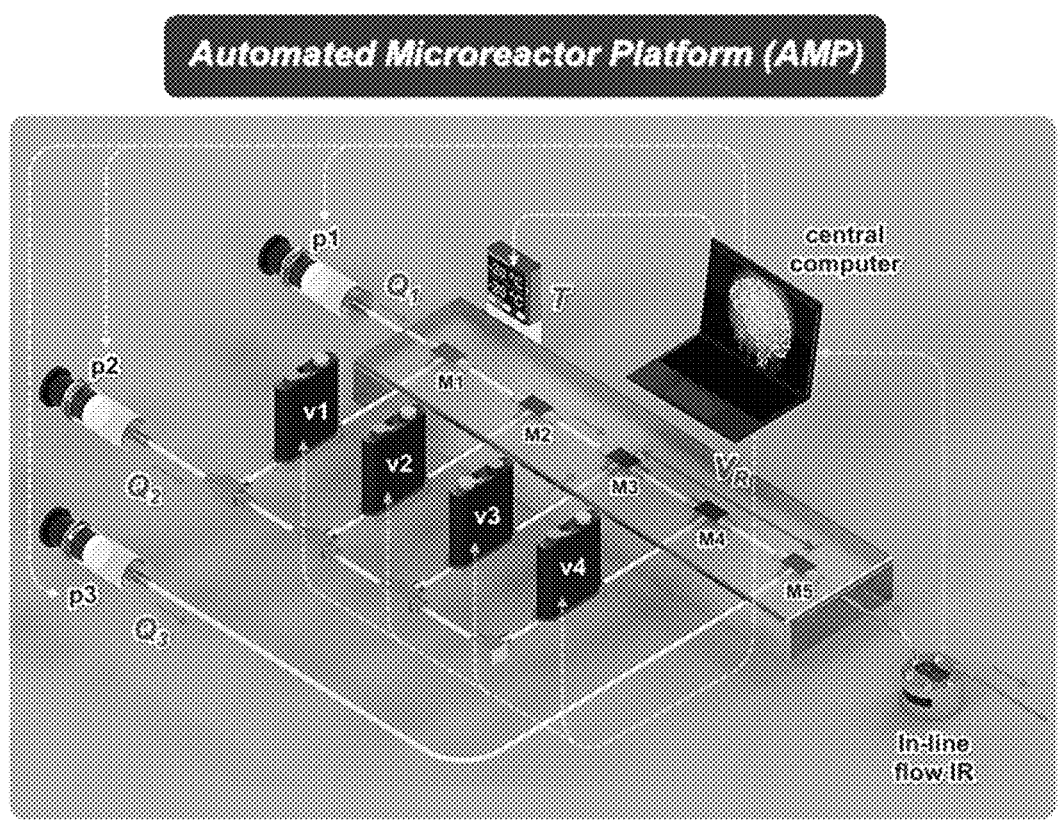
FIG. 1 is a schematic diagram illustrating an automated microreactor according to one embodiment of the present disclosure.
Figure 2:
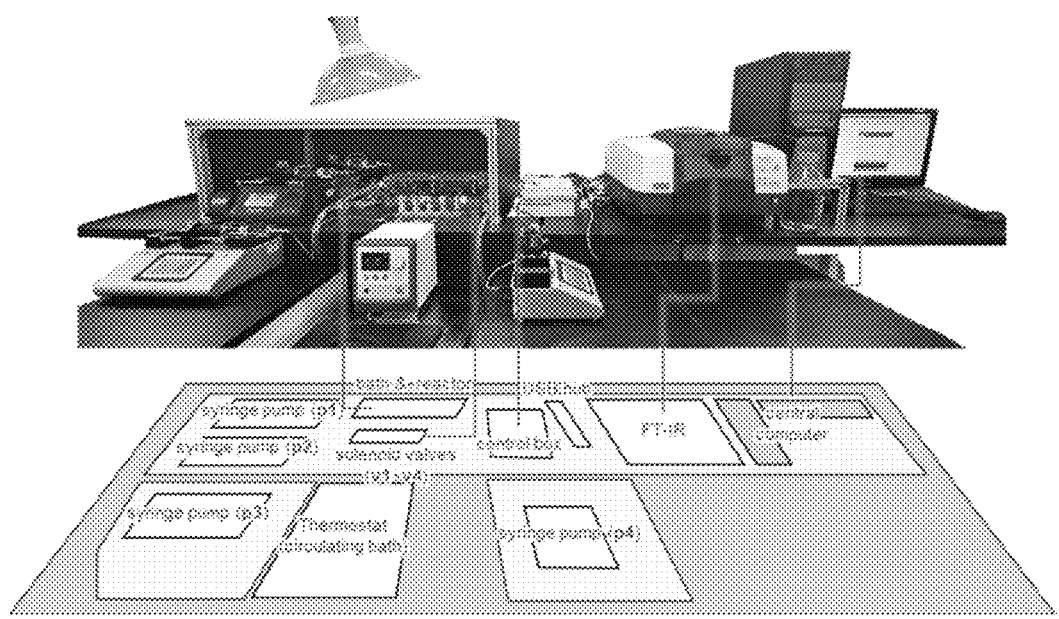
FIG. 2 is an actual view showing an automated microreactor according to one embodiment of the present disclosure.
Figure 3:
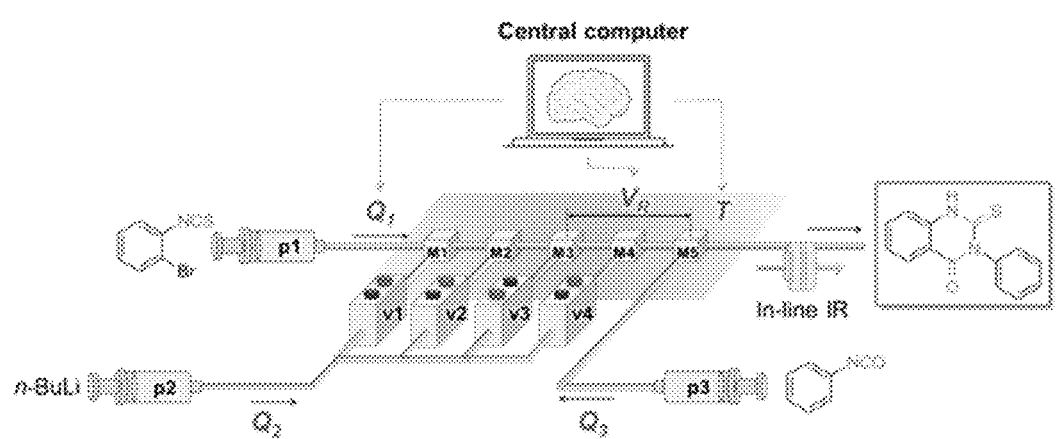
FIG. 3 is a schematic diagram illustrating an automated microreactor according to Example 1.
Figure 11:
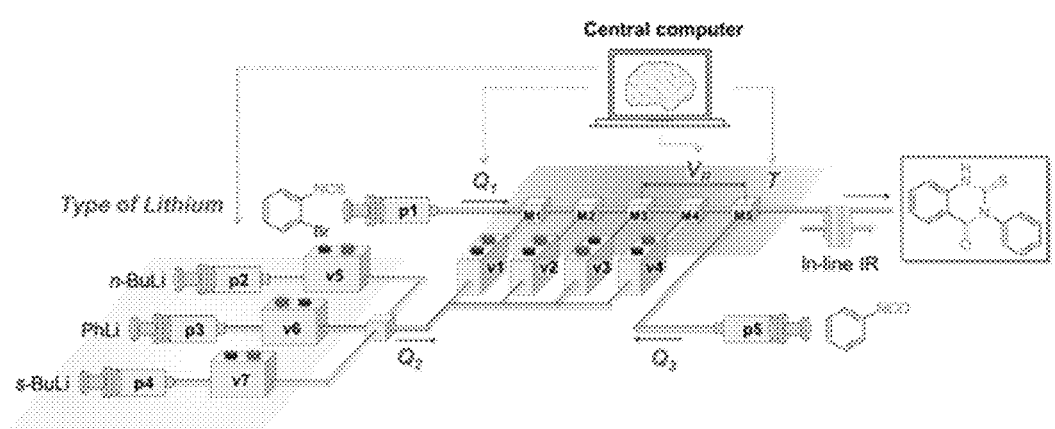
FIG. 11 is a schematic diagram illustrating an automated microreactor according to Example 2.

FIG. 1 is a schematic diagram illustrating an automated microreactor according to one embodiment of the present disclosure, FIG. 2 is an actual view showing an automated microreactor according to one embodiment of the present disclosure, FIG. 3 is a schematic diagram illustrating an automated microreactor according to Example 1, and FIG. 11 is a schematic diagram illustrating an automated microreactor according to Example 2.

Referring to FIGS. 1, 2, 3, and 11, the present disclosure provides an automated microreactor, which includes a raw material supply unit, an intermediate reaction unit, an intermediate reaction control unit, and a product reaction unit. The raw material supply unit has a plurality of flow rate controllers p1, p2, p3, p4, and p5 configured to supply a plurality of raw materials including first, second, and third raw materials, respectively, and control each of flow rates $Q_1$, $Q_2$, and $Q_3$ of the plurality of the raw materials. The intermediate reaction unit has a plurality of micromixers for intermediate M1, M2, M3, and M4 configured to generate a first mixture by mixing the first and second raw materials supplied from the raw material supply unit and a plurality of tubular reactors for intermediate configured to generate an intermediate product by a reaction of the first mixture. The intermediate reaction control unit has valve members v1, v2, v3, v4, v5, v6, and v7 configured to control a length of the tubular reactor for intermediate and at least one type of multiple types of the second raw material supplied. The product reaction unit configured to produce a product has a product micromixer M5 configured to mix the intermediate product supplied from the intermediate reaction unit and the third raw material supplied from the raw material supply unit to produce a second mixture In addition, a reaction time of the first mixture may be controlled by the flow rates $Q_1$ and $Q_2$ of the first and second raw materials controlled by the flow rate controllers and a reaction volume $V_R$ of the tubular reactor for intermediate controlled by the valve members v1, v2, v3, and v4.

In addition, the plurality of the micromixers for intermediate may include a first micromixer for intermediate, a second micromixer for intermediate, ..., an i-th micromixer for intermediate, ..., and an n-th micromixer for intermediate (n and i are each independently a natural number, and 1≤i≤n) and the plurality of tubular reactors for intermediate may include a first tubular reactor for intermediate, a second tubular reactor for intermediate, ..., an i-th tubular reactor for intermediate, ..., and an n-th tubular reactor for intermediate (n and i are each independently a natural number, and 1≤i≤n), wherein the n micromixers for intermediate and the n tubular reactors for intermediate may be alternately connected in series.

In addition, the reaction volume $V_R$ of the tubular reactor for intermediate may be controlled by arbitrarily selecting the i-th micromixer for intermediate to which the second raw material is to be supplied. The reaction volume may be a volume of a reactor, in which different types of raw materials meet and cause a reaction. Here, a reaction time can be controlled by adjusting the reaction volume.

In addition, the second raw material may be supplied to the i-th micromixer for intermediate, and the second raw material supplied to the i-th micromixer for intermediate may be mixed with the first raw material in the i-th micromixer for intermediate to form the first mixture, and the first mixture may react while passing through the reaction volume $V_R$, thereby producing the intermediate product.

In addition, reaction volumes $V_R$ may include a volume of the i-th tubular reactor for intermediate, ..., and a volume of the n-th tubular reactor for intermediate.

In addition, the flow rate controllers may include the first raw material flow rate controller p1, the second raw material flow rate controller p2, and the third raw material flow rate controller p3 which respectively control the flow rates of the first, second, and third raw materials.

In addition, the valve member may include a first valve, ..., an i-th valve, ..., and an n-th valve (n and i are each independently a natural number, and 1≤i≤n), wherein the n valves may be connected in parallel and respectively connected in series to the first micromixer for intermediate, ..., the i-th micromixer for intermediate, ..., and the n-th micromixer for intermediate. Each of the n valves may be connected in series to the second raw material flow rate controller, and each of the n valves may independently open and close to allow or block supply of the second raw material to each of the n micromixers for intermediate.

In addition, the second raw material may include a first second-raw material, ..., a j-th second-raw material, ..., and an m-th second-raw material (m and j are each independently a natural number, and 1≤j≤m), wherein the first to m second-raw materials may be different from each other, the second-raw material flow rate controller may include a first second-raw material flow rate controller, ..., a j-th second-raw material flow rate controller, ..., and an m-th second-raw material flow rate controller (m and j are each independently a natural number, and 1≤j≤m) that respectively controls the flow rates of the first to m-th second-raw materials, and the valve member may include a first valve, ..., a j-th valve, ..., and an m-th valve (m and j are each independently a natural number, and 1≤j≤m), wherein the m valves may be respectively connected in series to the first, ..., j-th, ..., and m-th second-raw material flow rate controllers. Each of the m valves may be connected in series to the intermediate reaction unit, and the m valves may independently open and close to allow or prevent that each of the m second-raw materials is supplied to the micromixer for intermediate.

In addition, the second raw material may include a first second-raw material, ..., a j-th second-raw material, ..., and an m-th second-raw material (m and j are each independently a natural number, and 1≤j≤m), wherein the first to m-th second-raw materials may be different from each other, the second-raw material flow rate controller may include a first second-raw material flow rate controller, ..., a j-th second-raw material flow rate controller, ..., and an m-th second-raw material flow rate controller (m and j are each independently a natural number, and 1≤j≤m) that respectively controls the flow fates of the first to m-th second-raw materials, and the valve member may further include a first valve, ..., a j-th valve, ..., and an m-th valve (m and j are each independently a natural number, and 1≤j≤m), wherein the m valves may be respectively connected in series to the first, ..., j-th, ..., and m-th second-raw material flow rate controllers. Each of the m valves may be connected in series to the n valves, and the m valves may each independently open and close to allow or prevent that each of the m second-raw materials is supplied to the micromixer for intermediate through each of the n valves.

In addition, the valve may be a solenoid valve.

In addition, the intermediate product may have a life span in a range of 1 millisecond (ms) to 100 seconds (s).

In addition, the micromixer for intermediate may have a T shape.

In addition, the microreactor may further include a temperature control unit configured to control a temperature T of each of the intermediate reaction unit and the product reaction unit.

In addition, the temperature control unit may include a circulating water bath and a cooling chamber.

In addition, the temperature control unit may adjust the temperature T of each of the intermediate reaction unit and the product reaction unit to any one temperature selected from in a range of −80° C. to 50° C. When the temperature is lower than −80° C., it may not be preferable since it is difficult to form the intermediate product and the product in the intermediate reaction unit and the product reaction unit, respectively. When the temperature exceeds 50° C., it may also not be preferable since by-products other than each of the target materials in the intermediate reaction unit and the product reaction unit may be produced.

In addition, the automated microreactor may further include an artificial intelligence unit configured to control each of the raw material supply unit, the intermediate reaction unit, the intermediate reaction control unit, the product reaction unit, and the temperature control unit.

In addition, the artificial intelligence unit may use a Bayesian optimization algorithm to derive optimized values of the reaction volume $V_R$ of the intermediate reaction unit, the flow rate Q of the raw material, the reaction temperature T of the intermediate reaction unit, and the reaction temperature T of the product reaction unit. The reaction temperature of the intermediate reaction unit and the reaction temperature of the product reaction unit may be the same.

In addition, each of the first, second, and third flow rate controllers may include a syringe pump.

In addition, the second raw material may include at least one organolithium compound selected from the group consisting of n-butyllithium, sec-butyllithium, n-hexyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Preferably, the second raw material may include the n-hexyllithium.

In addition, the automated microreactor may further include an analyzing unit including an analyzer to analyze the product generated in the product reaction unit.

In addition, the analyzing unit may include any one device selected from the group consisting of Fourier-transform infrared spectroscopy (FT-IR), nuclear magnetic resonance spectroscopy (NMR), gas chromatography-mass spectrometry (GC-MS), liquid chromatography-mass spectrometry (LC-MS), and ultraviolet-visible spectroscopy (UV-Vis).

In addition, the automated microreactor may further include a pressure sensor configured to detect an increase in pressure level.

In addition, the automated microreactor may be for use in a high-speed chemical reaction.

In addition, the automated microreactor may be used to derive optimal conditions for a reaction between the first and second raw materials.

According to the present disclosure, another aspect provides a method of optimizing a high-speed chemical reaction using an automated microreactor including a raw material supply unit, an intermediate reaction unit, an intermediate reaction control unit, and a product reaction unit. The method includes (a) controlling each of flow rates $Q_1$, $Q_2$, and $Q_3$ of a plurality of raw materials including first, second, and third raw materials using a plurality of flow rate controllers p1, p2, p3, p4, and p5 of the raw material supply unit, respectively and supplying the plurality of the raw materials at the controlled flow rates, (b) producing a first mixture by mixing the first and second raw materials supplied from the raw material supply unit in any one of a plurality of micromixers for intermediate M1, M2, M3, and M4 of the intermediate reaction unit, and producing an intermediate product by causing a reaction of the first mixture in at least one of a plurality of tubular reactors for intermediate, and (c) producing a second mixture by mixing the intermediate product supplied from the intermediate reaction unit and the third raw material supplied from the raw material supply unit in a product micromixer M5 of the product reaction unit, and preparing a product, wherein valve members v1, v2, v3, v4, v5, v6, and v7 of the intermediate reaction control unit controls a length of the tubular reactor for intermediate and at least one type of multiple types of the second raw material being supplied.

In addition, the optimizing of high-speed chemical reaction may be a method of controlling a reaction time of the first mixture by controlling the flow rates $Q_1$ and $Q_2$ of the first and second raw materials, respectively controlled with the flow rate controllers, and a reaction volume $V_R$ of the tubular reactor for intermediate controlled with the valve members v1, v2, v3, and v4.

In addition, the automated microreactor may further include a temperature control unit and an artificial intelligence unit. The temperature control unit controls a temperature T of each of the intermediate reaction unit and the product reaction unit, and the artificial intelligence unit controls each of the raw material supply unit, the intermediate reaction unit, the intermediate reaction control unit, the product reaction unit, and the temperature control unit.

In addition, the artificial intelligence unit may use a Bayesian optimization algorithm to derive optimized values of a reaction volume $V_R$ of the intermediate reaction unit, a flow rate Q of the raw material, a reaction temperature T of the intermediate reaction unit, and a reaction temperature T of the product reaction unit. The reaction temperature of the intermediate reaction unit and the reaction temperature of the product reaction unit may be the same.

EXAMPLE

Hereinafter, preferred examples of the present disclosure will be described.

Example 1: Automated Microreactor

FIG. 1 is a schematic diagram illustrating an automated microreactor according to one embodiment of the present disclosure. FIG. 2 is an actual view showing an automated microreactor according to one embodiment of the present disclosure. FIG. 3 is a schematic diagram illustrating an automated microreactor according to Example 1. An automated microreactor was prepared as illustrated in FIG. 1 to FIG. 3.

A raw material supply unit included PHD Ultra syringe pumps p1, p2, and p3 (manufactured by Harvard Apparatus) each equipped with an airtight syringe (50 mL, inner diameter: 27.6 mm) purchased from SGE Analytical Science. The pumps p1, p2, and p3 were used to supply 2-bromophenyl isothiocyanate (manufactured by Alfa Aesar) as a first raw material, n-butyllithium (n-BuLi, manufactured by Sigma-Aldrich) as a second raw material, and 4-nitrophenylisocyanate (manufactured by Alfa Aesar) as a third raw material, respectively. The syringe pumps p1, p2, and p3 were set such that the operation thereof such as stop, start, and flow rate were controlled with a MATLAB program through serial communication using an RS-232 interface.

As micromixers for intermediate, four T-shaped stainless steel (SUS304) micromixers M1, M2, M3, and M4 (manufactured by Sanko Seiki Co.) with an inner diameter of 250 μm and a T-shaped stainless steel (SUS304) micromixer M5 (manufactured by Sanko Seiki Co.) with an inner diameter of 500 μm were prepared.

For a tubular reactor for intermediate, a stainless steel (SUS304) tube with an inner diameter of 250 μm and a stainless steel (SUS304) tube with an inner diameter of 1000 μm were purchased from GL Science and used. The stainless steel (SUS304) tube with an inner diameter of 250 μm was cut into 4-cm pieces for use, and the stainless steel (SUS304) tube with an inner diameter of 1000 μm was cut into 70-cm pieces, 26-cm pieces, and 4-cm pieces for use.

The stainless steel (SUS304) tube with an inner diameter of 1000 μm was also used for a cooling unit. In this case, the tube was cut into 50-cm pieces.

The micromixers for intermediate and the tubular reactors for intermediate were alternately connected in series using a stainless steel fitting (manufactured by GL Science, ¹⁄₁₆" OUW) to form an intermediate reaction unit and a product reaction unit.

The second raw material flow rate controller p2 (i.e., syringe pump), which controls n-butyllithium (n-BuLi, manufactured by Sigma-Aldrich) serving as the second raw material, was connected in series to each of four solenoid valves v1, v2, v3, and v4 (LVM15R3HY-6C1U, manufactured by SMC Korea) with the use of a high purity PTFE tube (¹⁄₁₆" od, 0.03" id) and a polyethylene ether ketone ¹⁄₄-28 nut (IDEX HEALTH & SCIENCE). In this case, the four solenoid valves v1, v2, v3, and v4 were connected in parallel and used to control a reaction volume $V_R$, in which an exchange reaction occurs between bromine (Br) of the first raw material (2-bromophenyl isothiocyanate) and lithium (Li) of the second raw material (n-butyllithium).

The solenoid valves v1, v2, v3, and v4 were connected to a control box which was manufactured in-house using a microcontroller (Arduino Uno) purchased from Interaction Design Institutelvera (Italy), and the solenoid valves v1, v2, v3, and v4 were opened and closed by serial communication control between the microcontroller and the PC MATLAB program available from MathWorks (MA, USA). A pressure sensor (PA-830-101G-10) manufactured by Nidec Copal Electronics was installed between the syringe pump p1 and the micromixer for intermediate M1. The pressure sensor monitored pressure levels, identified problems such as blockages, and sent an analog signal proportional to the pressure level to the microcontroller (Arduino Uno) of the control box. The analog signal was transmitted into a pressure valve and then was read and monitored through serial communication with the MATLAB program on a PC.

The intermediate reaction unit and the product reaction unit were placed in a specially designed cooling chamber connected to a circulating water bath for the control of the temperature T thereof. A circulating water bath (RW3-2035, 20 L, −35° C. to 150° C.) manufactured by Jeio Tech (Korea) was connected to a computer through a RS-232 serial communication method and communicated with the PC via the Modbus protocol. This circulating water bath was controlled via the MATLAB program so that a target temperature and a pumping rate of a coolant could be controlled.

A typical FT-IR spectrometer (Jasco FT/IR-4600 spectrometer) was equipped with a sealed flow cell accessory (Specac®) having a ZnSe window (path length 0.1 mm) to build a flow-based in-line IR system. The sealed flow cell accessory was aligned in the FT-IR spectrometer device with the use of a dedicated holder and connected to AMR through a 1/16" Swagelok fitting connected to the flow cell. Flow-based monitoring was set to be maintained continuously so that spectral data was collected at 20-second intervals with eight scans per sample.

The obtained data were processed in real time using a MACRO program in-house developed based on the MATLAB and Python language. The data were expressed in yield values or conversion data.

After reaching a steady state, unless otherwise specified, a product solution was collected for 30 seconds at a rear stage of the reactor or in-line analysis apparatus.

Example 2: Automated Microreactor Capable of Deriving Organolithium Optimized for Reaction Among a Plurality of Organolithiums FIG. 11 is a schematic diagram illustrating an automated microreactor according to Example 2. The automated microreactor was prepared as illustrated in FIG. 1.

Unlike the automated microreactor of Example 1 in which only n-butyllithium (n-BuLi, manufactured by Sigma-Aldrich) was used as the second raw material, three types of second-raw materials, that is, n-butyllithium (n-BuLi, manufactured by Sigma-Aldrich), phenyllithium (PhLi, manufactured by Sigma-Aldrich), and sec-butyllithium (s-BuLi, manufactured by Sigma-Aldrich) were used in Example 2. Except for structural changes, the automated microreactor of Example 2 was prepared in the same manner as the automated microreactor of Example 1.

Raw materials including 2-bromophenyl isothiocyanate (manufactured by Alfa Aesar) as a first raw material, n-butyllithium (n-BuLi, manufactured by Sigma-Aldrich), phenyllithium (PhLi, manufactured by Sigma-Aldrich), and sec-butyllithium (s-BuLi, manufactured by Sigma-Aldrich) as a second raw material, and 4-nitrophenylisocyanate (manufactured by Alfa Aesar) as a third raw material were supplied through PHD Ultra syringe pumps p1, p2, p3, p4, and p5 (manufactured by Harvard Apparatus) each equipped with an airtight syringe (50 mL, inner diameter: 27.6 mm) purchased from SGE Analytical Science.

The syringe pumps p2, p3, and p4 supplying n-butyllithium (n-BuLi, manufactured by Sigma-Aldrich), phenyllithium (PhLi, manufactured by Sigma-Aldrich), and sec-butyllithium (s-BuLi, manufactured by Sigma-Aldrich), respectively, were connected in series to solenoid valves v5, v6, and v7 (LVM15R3HY-6C1U, SMC Korea), respectively, via a high purity PTFE tube (1/16" od, 0.03" id) and a polyethylene ether ketone ¼-28 nut (IDEX HEALTH & SCIENCE).

In this case, the three solenoid valves v5, v6, and v7 were connected in parallel and connected in series to the parallel-connected four solenoid valves v1, v2, v3, and v4 of the automated microreactor in Example 1.

The three solenoid valves v5, v6, and v7 were used to selectively provide any one of the three types of second raw materials, and the four solenoid valves v1, v2, v3, and v4 were used to control reaction volumes $V_R$ in which an exchange reaction occurs between bromine (Br) of the first raw material (2-bromophenyl isothiocyanate) and lithium (Li) of any one type (selected from n-BuLi, PhLi, and s-BuLi) of the second raw material.

EXPERIMENTAL EXAMPLE

Experimental Example 1: Confirmation of Thioquinazolinone Cyclic Compound Synthesis FIG. 4 shows a $^1$H NMR result of a thioquinazolinone cyclic compound prepared with the automated microreactor of Example 1, and FIG. 5 shows a $^{13}$C NMR result of a thioquinazolinone cyclic compound prepared with the automated microreactor of Example 1.

Figure 4:
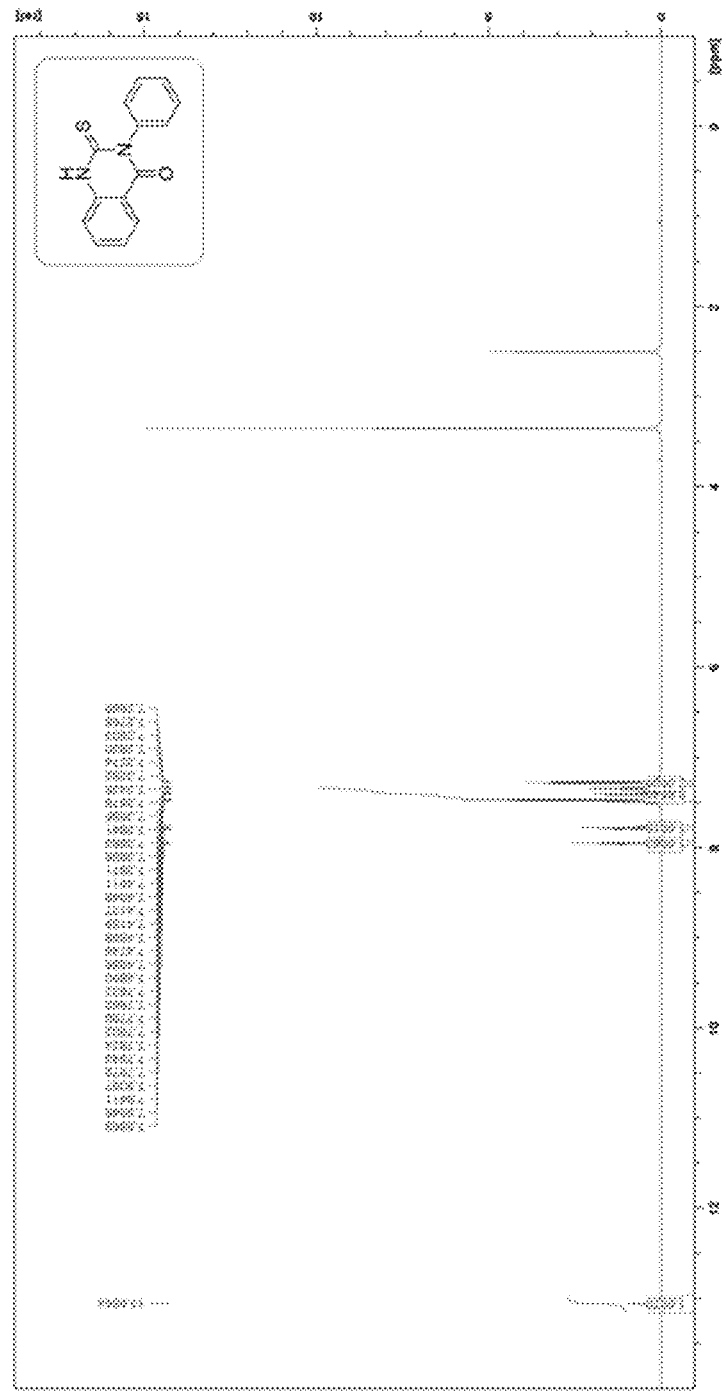
FIG. 4 shows a $^1H$ NMR result of a thioquinazolinone cyclic compound prepared with an automated microreactor of Example 1.
Figure 5:
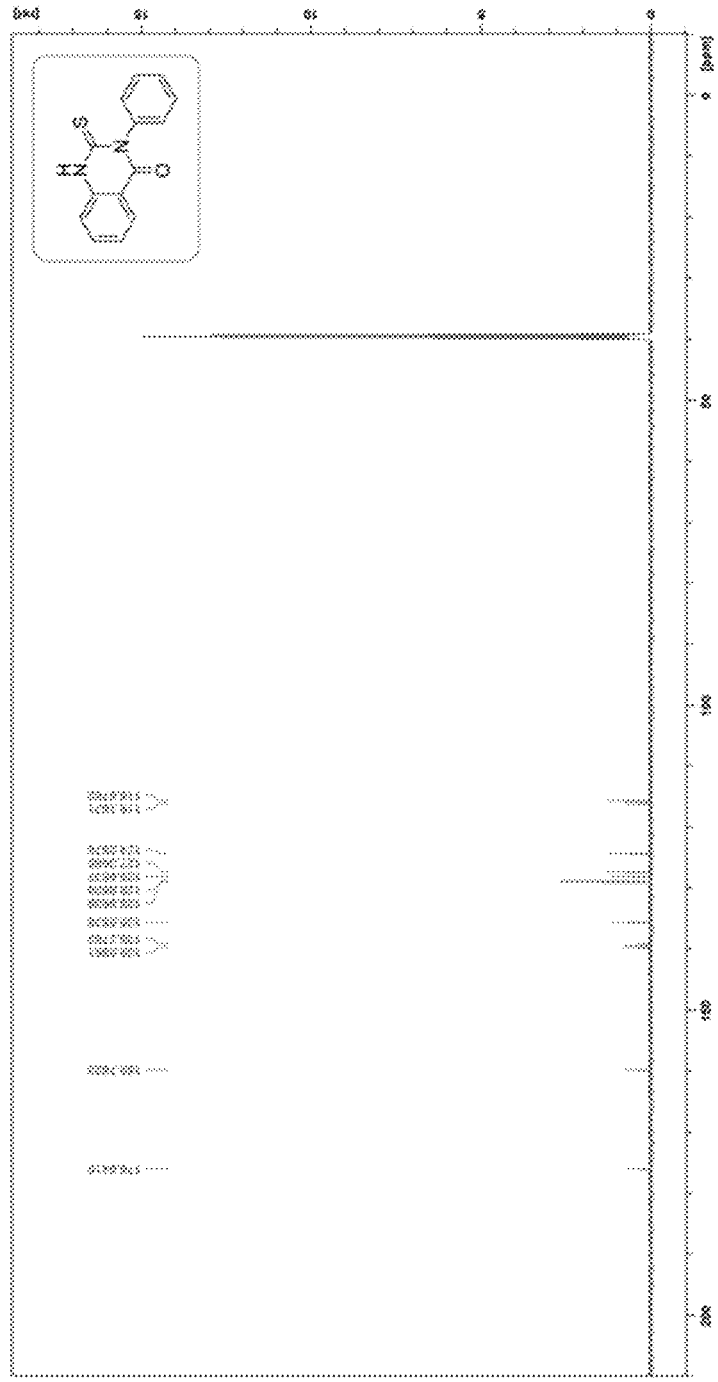
FIG. 5 shows a $^{13}C$ NMR result of a thioquinazolinone cyclic compound prepared with an automated microreactor of Example 1.

Referring to FIGS. 4 and 5, 3-phenyl-2-thioxo-2,3-dihydroquinazolin-4(1H)-one, which was a target material represented by Structural Formula 1 shown below, was confirmed to be well synthesized with the automated microreactor of Example 1.

Structural Formula 1

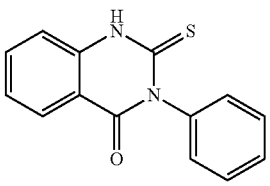

Experimental Example 2: In-Line FT-IR Result of Automated Microreactor

Figure 6:
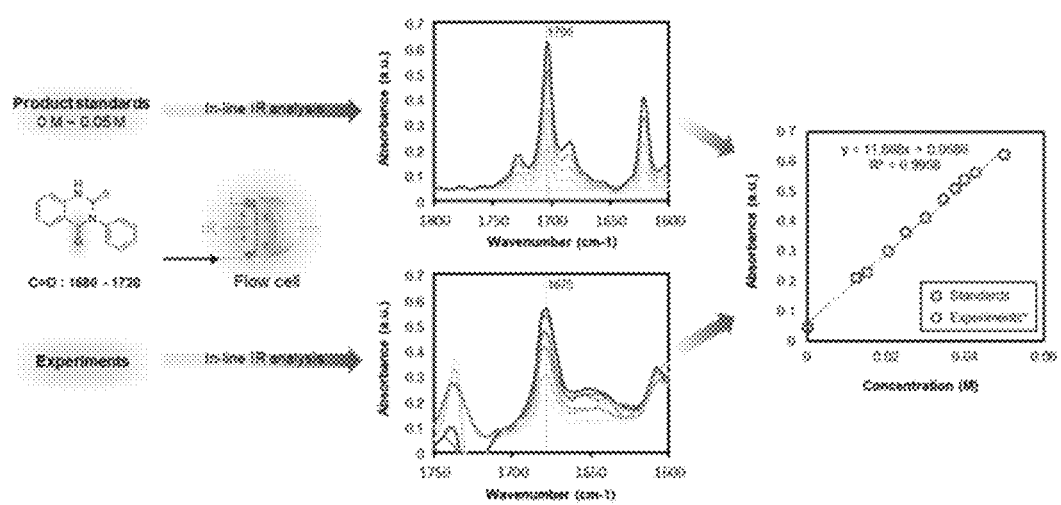
FIG. 6 shows FT-IR results of a thioquinazolinone cyclic compound prepared with an automated microreactor of Example 1 and a standard thioquinazolinone cyclic compound and shows a calibration curve for FT-IR peak intensity versus concentration of thioquinazolinone cyclic compound.

FIG. 6 shows FT-IR results of a thioquinazolinone cyclic compound prepared with the automated microreactor of Example 1 and a standard thioquinazolinone cyclic compound. FIG. 6 shows a calibration curve for FT-IR peak intensity versus concentration of thioquinazolinone cyclic compound. Specifically, FIG. 6 shows the concentration-based FT-IR analysis results of the standard thioquinazolinone cyclic compound (above) and the thioquinazolinone cyclic compound prepared with the automated microreactor of Example 1. Based on the results, the calibration curve for the FT-IR peak intensity versus the concentration of the thioquinazolinone cyclic compound was made.

Referring to FIG. 6, the carbonyl group absorption peak of the standard thioquinazolinone cyclic compound appeared at 1705 $cm^{-1}$ while the carbonyl group absorption peak of the thioquinazolinone cyclic compound prepared with the automated microreactor of Example 1 appeared at 1675 $cm^{-1}$. That is, it is confirmed that the carbonyl group absorption peaks of the compounds are different from each other, which results from a characteristic peak shift due to a reaction quenching of the thioquinazolinone cyclic compound prepared with the microreactor. The calibration curve for FT-IR peak intensity versus the concentration of the thioquinazolinone cyclic compound appeared similar, demonstrating the reliability of the calibration plot.

Figure 7:
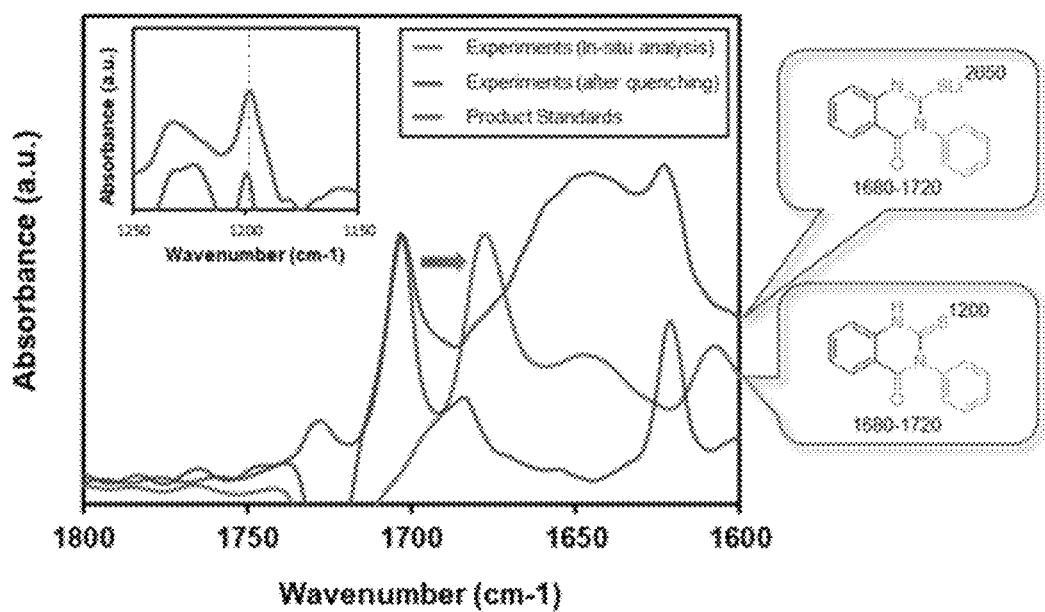
FIG. 7 shows results of characteristic peak shift followed by reaction quenching of a thioquinazolinone cyclic compound prepared with an automated microreactor of Example 1.

FIG. 7 shows results of characteristic peak shift caused by reaction quenching of a thioquinazolinone cyclic compound prepared with the automated microreactor of Example 1.

According to FIG. 7, the carbonyl group absorption peak appeared at 1675 $cm^{-1}$ in in-situ FT-IR analysis of the thioquinazolinone cyclic compound prepared with the automated microreactor of Example 1 while the carbonyl group absorption peak appeared at 1705 $cm^{-1}$ in FT-IR after the quenching. In addition, it is confirmed that the absorption peak shifted but the intensity of absorbance did not change. Such a shift is presumed to be due to the enhanced C=O bonding of the carbonyl group attributable to extinction of lithium thiolate.

Experimental Example 3: Effect of Using Pressure Sensor

Figure 8:
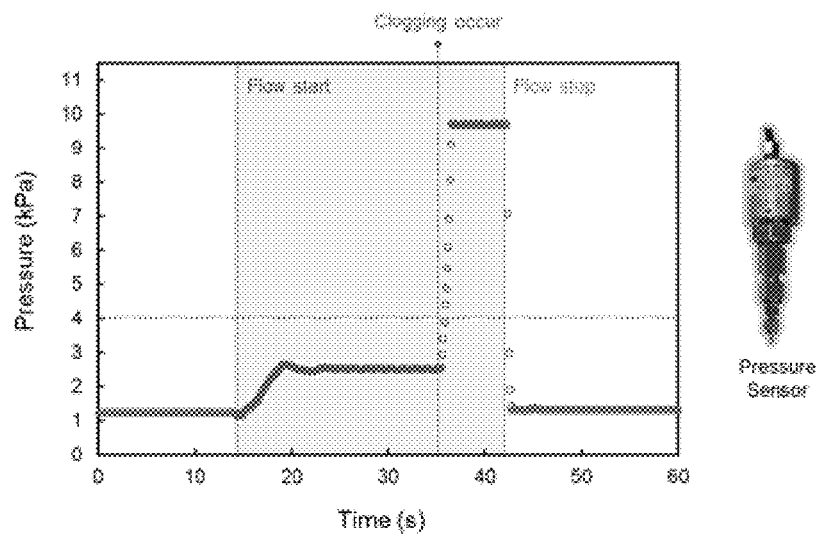
FIG. 8 shows a pressure sensor used in an automated microreactor and a profile of the internal pressure of the automated microreactor of Example 1.

FIG. 8 shows a pressure sensor used in the automated microreactor and a profile of the internal pressure of the automated microreactor of Example 1. Since clogging in the microreactors, which have narrow internal volumes, has been a chronic problem of the microreactors, a pressure sensor was installed between the syringe pump p1 and the micromixer for intermediate M1 to detect an increase in the total pressure of the microreactor caused by the clogging.

According to FIG. 8, clogging occurred at high velocity due to the precipitation of an aryl lithium intermediate product, and information indicating that the internal pressure of the automated microreactor increased to 4 kPa or higher was transmitted to a computer in the form of a signal from the pressure sensor. A programmed algorithm automatically stopped the automated microreactor within 7 seconds after the occurrence of the clogging, thereby enabling the internal pressure to be restored to atmospheric pressure.

Figure 9A:
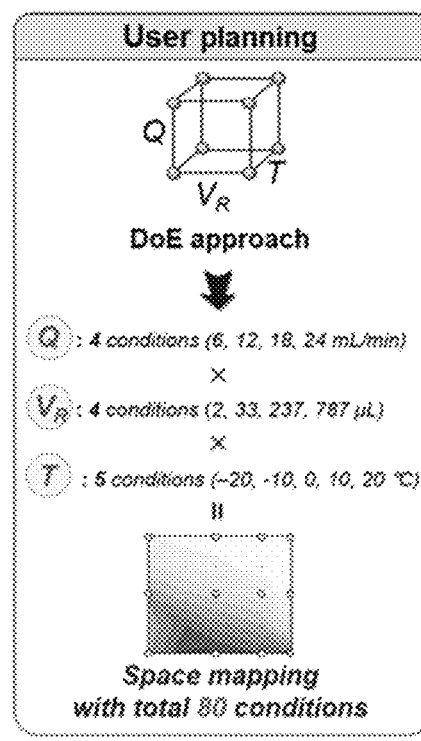
FIGS. 9A and 9B show summarized results of yield values of a thioquinazolinone cyclic compound prepared under 80 conditions arbitrarily set by a user with an automated microreactor of Example 1.
Figure 9B:
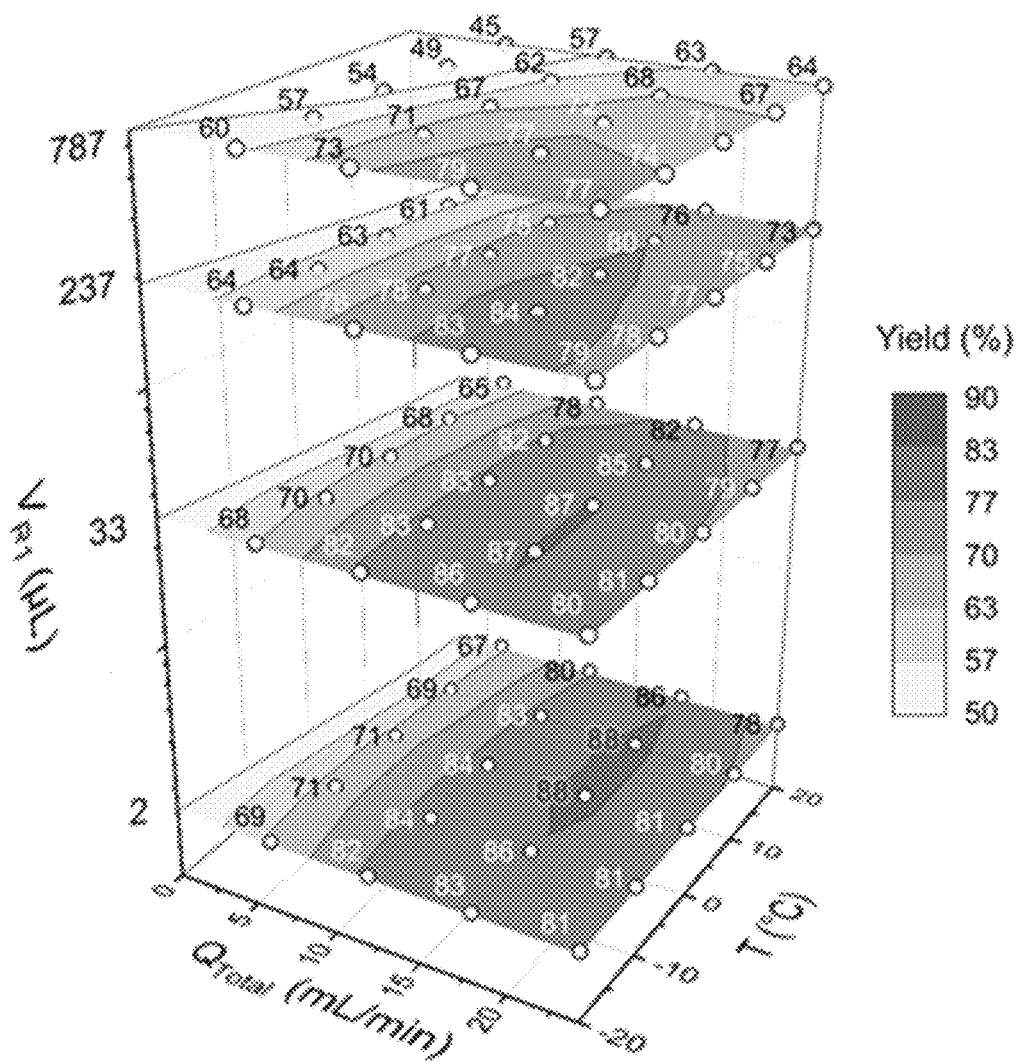

Experimental Example 4: Method of Optimizing High-Speed Chemical Reaction Under Three Conditions of Flow Rate Q, Reaction Volume $V_R$, and Reaction Temperature T Experimental Example 4-1: User Condition Setting FIG. 9A shows conditions of a flow rate Q, a reaction volume $V_R$, and a reaction temperature T set by a user for the optimized synthesis of 3-phenyl-2-thioxo-2,3-dihydroquinazolin-4(1H)-one in high-speed chemistry using the automated microreactor of Example 1, and FIG. 9B shows a summarized result of yield values of 3-phenyl-2-thioxo-2,3-dihydroquinazolin-4(1H)-one under 80 conditions set in FIG. 9A.

Specifically, the 2-bromophenyl isothiocyanate, n-butyllithium, and 4-nitrophenylisocyanate were supplied from the raw material supply unit at flow rates $Q_1$, $Q_2$, and $Q_3$ as set by the user.

The 2-bromophenyl isothiocyanate was injected into the intermediate reaction unit, and the n-butyllithium was injected into any one of the four micromixers for intermediate M1, M2, M3, and M4 selected by the valve member (any one of the four solenoid valves v1, v2, v3, and v4), which was designated to release the n-butyllithium under control of the central computer. As a result, a first mixture was prepared. The 2-bromophenyl isothiocyanate and the n-butyllithium in the first mixture underwent a Br—Li exchange reaction to produce an intermediate product. As a result, the reaction volume $V_R$ through which the first mixture passes and reacts was determined by a position at which the 2-bromophenyl isothiocyanate and the n-butyllithium started mixing.

The intermediate product and 4-nitrophenylisocyanate were mixed in the product micromixer M5 to form a second mixture and then the second mixture underwent a reaction to produce a product.

The product was analyzed with an in-line FT-IR system, and spectral data were automatically collected and processed in a central computer and were expressed in yield values of reactions.

Referring to FIG. 9A, the flow rate Q was adjusted to 6 mL/min, 12 mL/min, 18 mL/min, and 24 mL/min. The flow rate Q is the sum of the flow rate $Q_1$ of the 2-bromophenyl isothiocyanate, the flow rate $Q_2$ of the n-butyllithium, and the flow rate $Q_3$ of the 4-nitrophenylisocyanate, and the ratio of $Q_1:Q_2:Q_3$ was adjusted to 4:1:3. The reaction volumes $V_R$ were set to be 787 µL, 237 µL, 33 µL, and 2 µL according to the position at which the n-butyllithium was injected. In particular, each of the four valves v1, v2, v3, and v4 which were respectively connected in series to the four micromixers for intermediate M1, M2, M3, and M4 was independently opened and closed so that the n-butyllithium was supplied to any one of the four micromixers for intermediate to control the reaction volume. The reaction temperature T was set to 5 different temperatures of −20° C., −10° C., 0° C., 10° C., and 20° C., so that the reaction was performed under a total of 80 conditions for optimization of synthesis in high-speed chemistry.

Referring to FIG. 9B, it is confirmed that the product can be produced at a maximum synthesis yield of 88% at a flow rate of 18 mL/min at a reaction volume of 2 µL at a reaction temperature of 10° C. In addition, in the method of optimizing the high-speed chemical reaction using the automated microreactor of Example 1, it is confirmed that the total operating time (4 hours for 80 reaction conditions) can be reduced significantly without human intervention, except for the planning and decision of reaction conditions. Generally, when a person directly controls 80 reaction conditions, it takes more than one week.

Experimental Example 4-2: Use of Bayesian Optimization Algorithm

Figure 10A:
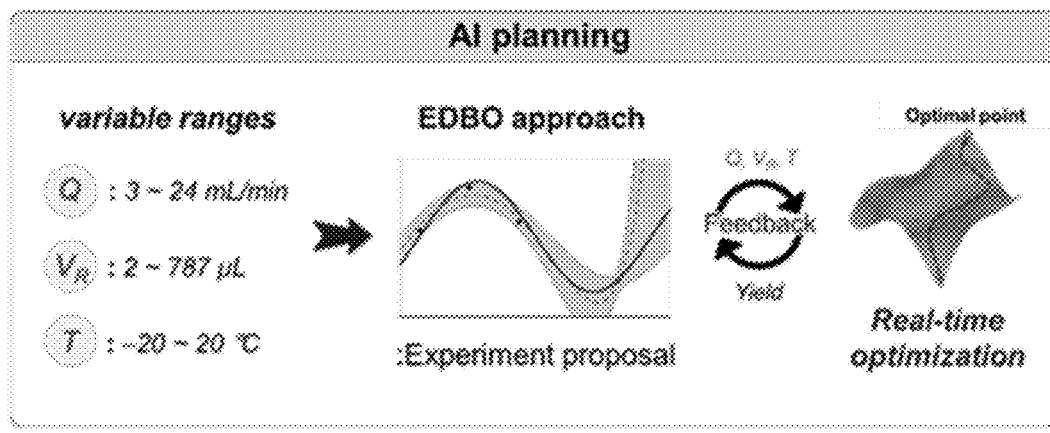
FIGS. 10A to 10E show ranges of conditions in which an artificial intelligence derives optimal synthesis conditions with an automated microreactor of Example 1.

FIG. 10A is a schematic diagram illustrating a method of deriving optimized values of a flow rate Q, a reaction volume $V_R$, and a reaction temperature T using a Bayesian optimization algorithm to synthesize 3-phenyl-2-thioxo-2,3-dihydroquinazolin-4(1H)-one using the automated microreactor of Example 1.

Referring to FIG. 10A, the flow rate Q and the reaction temperature T were continuously adjusted in a range of 6 mL/min to 24 mL/min and a range of −20° C. to 20° C., respectively, while the reaction volume $V_R$ was discontinuously changed to 787 μL, 237 μL, 33 μL, and 2 μL. The flow rate Q is the sum of a flow rate $Q_1$ of the 2-bromophenyl isothiocyanate, a flow rate $Q_2$ of the n-butyllithium, and a flow rate $Q_3$ of the 4-nitrophenylisocyanate, and the ratio of $Q_1:Q_2:Q_3$ was set to 4:1:3. The reaction volumes $V_R$ were set to be 787 μL, 237 μL, 33 μL, and 2 μL according to the injection positions of the n-butyllithium. Particularly, each of the four valves v1, v2, v3, and v4 which were respectively connected in series to the four micromixers for intermediate M1, M2, M3, and M4 was independently opened and closed so that the n-butyllithium was supplied to any one of the four micromixers for intermediate. In this manner, the reaction volumes were controlled.

Initial reaction conditions for experiments were randomly selected within variable ranges, and the reaction products were automatically analyzed with a technique of inline FT-IR. Each round consisted of 10 experiments, and 5 rounds were performed for statistical performance verification. The values of data obtained in each round were initialized so as not to affect other rounds.

Figure 10B:
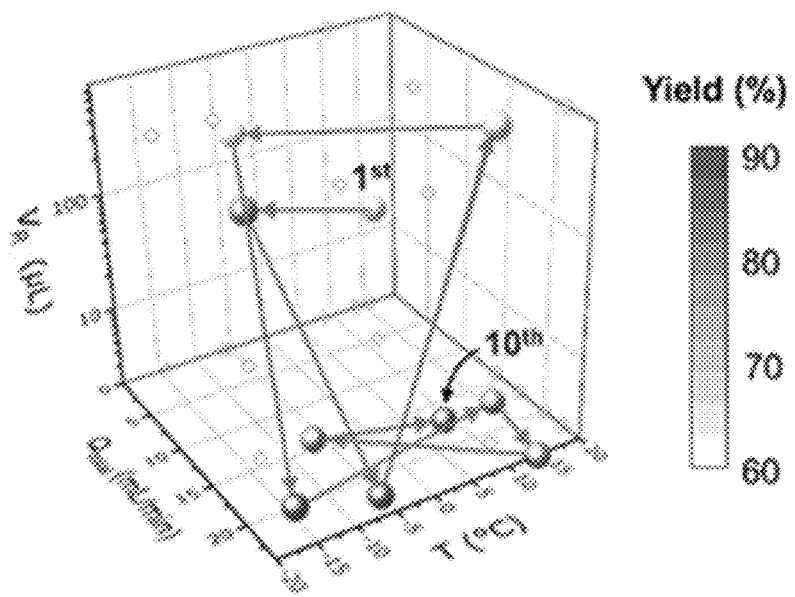

FIG. 10B shows the results of 10 optimization reaction experiments (Round 1) in which the Bayesian optimization algorithm and the automated microreactor of Example 1 were used together.

Referring to FIG. 10B, it is confirmed that the automated microreactor of Example 1 successfully performed 10 different reactions to achieve the desired yield of 88% (at a flow rate of 17 mL/min, a reaction volume of 2 μL, and a reaction temperature of 9° C.) as indicated by a direction of an arrow.

A case RS where a condition was randomly selected among 80 conditions by a user according to Experimental Example 2 and a case BO where a condition was set by the Bayesian optimization algorithm according to Experimental Example 3 were compared. 100 rounds were performed for the case RS, and 5 rounds were performed for the case BO, in which each round consisted of 10 experiments. Each round took less than an hour on average.

Figure 10C:
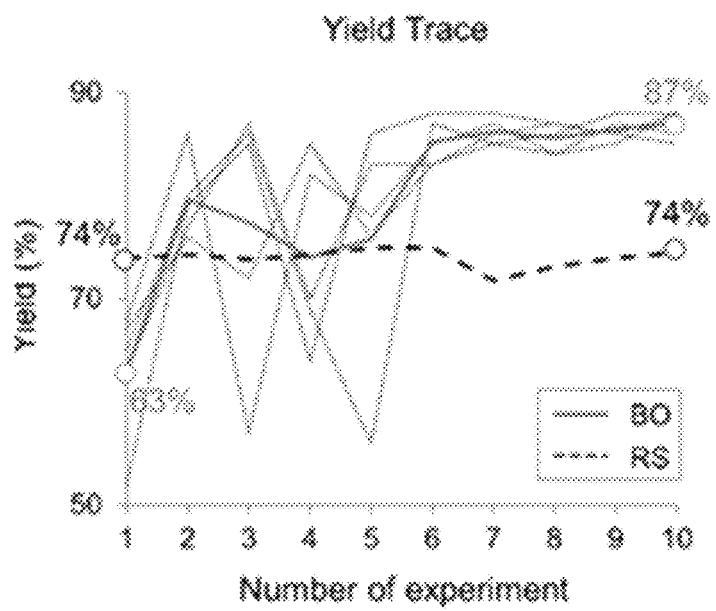

FIG. 10C shows a graph of yield values. Particularly, the graph shows average yield values for the case RS (dashed line) where the experimental condition is randomly selected among 80 conditions by the user. FIG. 10C also shows average yield values for the case BO (solid line) where the experimental condition is set by the Bayesian optimization algorithm and yield values per respective rounds for the case (dotted lines) where the experimental condition is set by the Bayesian optimization algorithm.

Referring to FIG. 10C, it is confirmed that the final average yield value obtained by setting the experimental condition with the Bayesian optimization algorithm is 87% which is significantly improved compared to an initial average yield value of 63%. From this fact, it is seen that the result of this case is clearly distinguished from the result of the case RS (initial and final average yield values: 74%) that did not track the maximum yield value. This indicates that when the Bayesian optimization algorithm is used, it is possible to successfully predict the reaction conditions which lead to the desired yield with only 10 experiments.

In addition, when the Bayesian optimization algorithm was used, it is confirmed that the yield value fluctuated significantly before the sixth experiment, and the average yield value did not always increase. It is because of a search process that involves rapidly eliminating the largest portion of a search space, the portion having a low probability that the optimal reaction condition is included.

After the sixth experiment, the algorithm highly successfully selected a reaction condition that is considered to be the closest to the optimal reaction condition within the reduced search space so that the reaction could be performed under the condition. For this reason, it is confirmed that the average yield value can gradually increase with much less change.

Figure 10D:
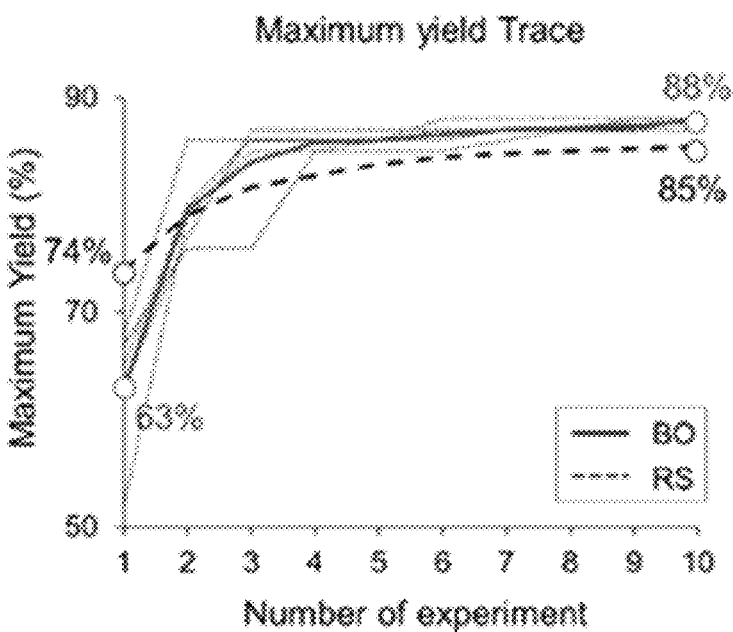

FIG. 10D shows the maximum yield value among the obtained yield values. Particularly, the graph shows average yield values for the case RS (dashed line) where the experimental condition is randomly selected among 80 conditions by the user. The graph also shows average yield values for the case BO (solid line) where the experimental condition is set by the Bayesian optimization algorithm and yield values of respective rounds for the case (dotted line) where the experimental condition is set by the Bayesian optimization algorithm.

Referring to FIG. 10D, the Bayesian optimization algorithm found a reaction condition under which the final yield value reached 88% through at most 10 experiments, in which 88% is the final yield value achieved after 80 experimental mappings performed by the user in Experimental Example 2. On the other hand, it is confirmed that the average yield value of the case RS was only 85%, which was less than the desired yield.

Therefore, when the Bayesian optimization algorithm is used along with the automated microreactor of Example 1, it is possible to find statistically optimal conditions even with a small number of experiments.

Figure 10E:
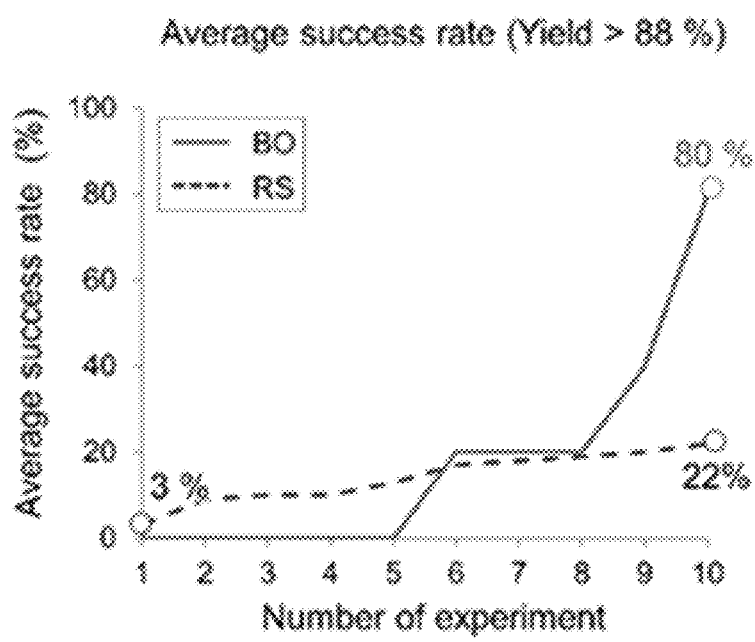

FIG. 10E shows results of an average success rate of the numbered experiments, which were implemented in order, to reach the highest yield. Particularly, the graph shows average yield values for the case RS (dashed line) where the experimental condition is randomly selected among 80 conditions by the user and average yield values for the case BO (solid line) when the experimental condition is set by the Bayesian optimization algorithm.

Referring to FIG. 10E, it is confirmed that there is a big difference in the success rate of finding the optimal point between the case BO where the condition is set by the Bayesian optimization algorithm, which exhibits a success rate of 80%, and the case RS where the condition is randomly selected by the user, which exhibits a success rate of 22%.

Experimental Example 5: Method of optimizing high-speed chemical reaction under four conditions of flow rate Q, reaction volume $V_R$, reaction temperature T, and type of organolithium FIG. 12A is a schematic diagram illustrating a method of deriving optimized values of a flow rate Q, a reaction volume $V_R$, a reaction temperature T, and a type of organolithium using the Bayesian optimization algorithm to synthesize 3-phenyl-2-thioxo-2,3-dihydroquinazolin-4(1H)-one with the automated microreactor of Example 2.

Figures 12A, 12B:
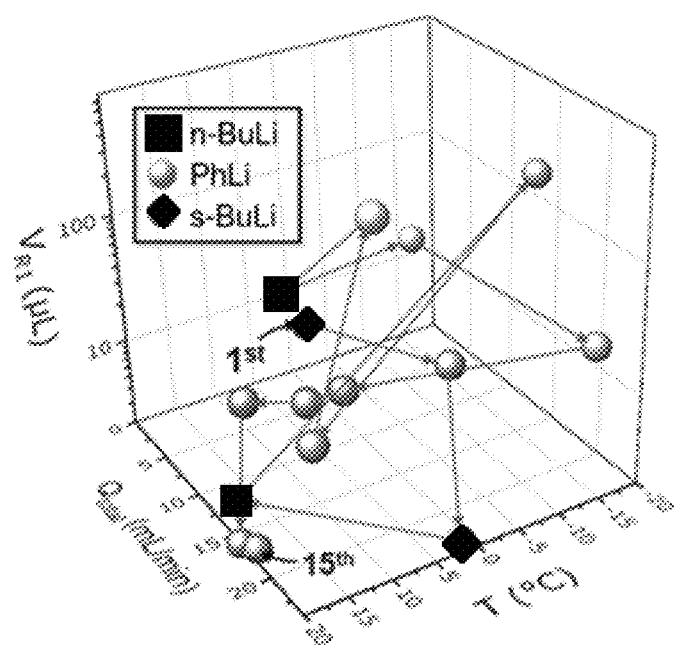
FIGS. 12A to 12C show ranges of conditions in which an artificial intelligence derives optimal synthesis conditions with an automated microreactor of Example 2.

Referring to FIG. 12A, the flow rate Q and the reaction temperature T were continuously adjusted in a range of 6 mL/min to 24 mL/min and a range of −20° C. to 20° C., respectively, the n-butyllithium (n-BuLi), phenyllithium (PhLi), and sec-butyllithium (s-BuLi) were used as organolithiums, and, the reaction volume $V_R$ of each of the organolithiums was discontinuously changed to 787 μL, 237 μL, 33 μL, and 2 μL.

In this case, the flow rate Q is the sum of a flow rate $Q_1$ of the 2-bromophenyl isothiocyanate, a flow rate $Q_2$ of the organolithium (any one selected from the group consisting of n-BuLi, PhLi, and s-BuLi), and a flow rate $Q_3$ of the 4-nitrophenylisocyanate, and the ratio of $Q_1:Q_2:Q_3$ was set to 4:1:3.

The reaction volumes $V_R$ were set to be 787 μL, 237 μL, 33 μL, and 2 μL according to the position at which the n-butyllithium was injected. Particularly, each of the four valves v1, v2, v3, and v4 which were respectively connected in series to four micromixers for intermediate M1, M2, M3, and M4, was independently opened and closed so that the n-butyllithium was supplied to any one of the four micromixers for intermediate, to control the reaction volume.

Each of the three valves v5, v6, and v7 which were respectively connected to the syringe pumps p2, p3, and p4 that respectively contain the n-BuLi, PhLi, and s-BuLi was independently opened and closed so that any one of the n-BuLi, PhLi, and s-BuLi was supplied to any one of the micromixers for intermediate M1, M2, M3, and M4 to control the type of organolithium used.

In addition, initial reaction conditions for experiments were randomly selected within variable ranges, and the reaction products were automatically analyzed with a technique of inline FT-IR. A total of 15 experiments were performed to derive the optimized values of the flow rate Q, the reaction volume $V_R$, the reaction temperature T, and the type of the organolithium.

Figure 12C:
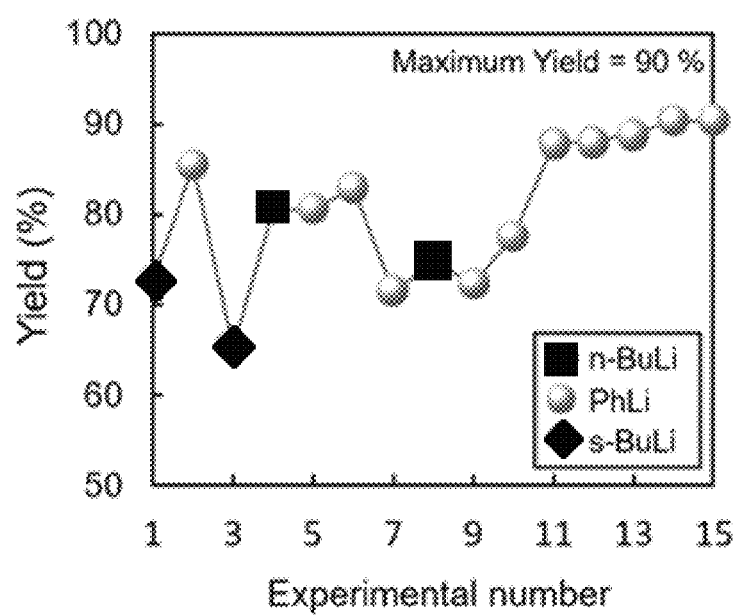

FIG. 12B shows the results of 15 optimization reaction experiments in which the Bayesian optimization algorithm and the automated microreactor of Example 2 were used together. FIG. 12C shows a summarized result of yield values of the 15 optimization reaction experiments in which the Bayesian optimization algorithm and the automated microreactor of Example 2 were used together.

Referring to FIGS. 12B and 12C, when phenyllithium (PhLi) was supplied as organolithium at a flow rate Q of 17 mL/min in a reaction volume $V_R$ of 2 μL at a reaction temperature T of 19° C., it was confirmed that the yield value reached 90% within 1 hour and 30 minutes, which is superior to the yield value 88% that was generally obtained with the use of the n-butyllithium (n-BuLi).

Therefore, when the automated microreactor of the present disclosure is used, it is possible to derive the optimized values for the flow rate Q, reaction volume $V_R$, and reaction temperature T as well as the type of organolithium in a short time The scope of the present disclosure is defined only by the appended claims rather than the detailed description. All changes or modifications derived from the meaning and scope of the claims and the concept of equivalents should be construed to fall within the scope of the present disclosure.

What is claimed is:

1. An automated microreactor comprising:
   a raw material supply unit comprising a plurality of flow rate controllers configured to supply a plurality of raw materials including first, second, and third raw materials, respectively, and control flow rates of the plurality of the raw materials, respectively;
   an intermediate reaction unit comprising a plurality of micromixers for intermediate configured to produce a first mixture by mixing the first and second raw materials supplied from the raw material supply unit, and a plurality of tubular reactors for intermediate configured to produce an intermediate product by a reaction of the first mixture;
   an intermediate reaction control unit comprising a valve member configured to control a length of the tubular reactor for intermediate and at least one type of multiple types of the second raw material being supplied; and
   a product reaction unit configured to produce a product, the product reaction unit comprising a product micromixer configured to mix the intermediate product supplied from the intermediate reaction unit and the third raw material supplied from the raw material supply unit to produce a second mixture.

2. The automated microreactor of claim 1, wherein a reaction time of the first mixture is controlled by: the flow rates of the first and second raw materials controlled by the flow rate controllers; and a reaction volume of the tubular reactor for intermediate controlled by the valve member.

3. The automated microreactor of claim 1, wherein the plurality of the micromixers for intermediate comprises a first micromixer for intermediate, a second micromixer for intermediate, . . . , an i-th micromixer for intermediate, . . . , and an n-th micromixer for intermediate (n and i are each independently a natural number, and 1≤ i≤n) and
   the plurality of tubular reactors for intermediate comprises a first tubular reactor for intermediate, a second tubular reactor for intermediate, . . . , an i-th tubular reactor for intermediate, . . . , and an n-th tubular reactor for intermediate (n and i are each independently a natural number and, 1≤i≤n), wherein the n micromixers for intermediate and the n tubular reactors for intermediate are alternately connected in series.

4. The automated microreactor of claim 3, wherein the reaction volume of the tubular reactor for intermediate is controlled by arbitrarily selecting the i-th micromixer for intermediate to which the second raw material is to be supplied.

5. The automated microreactor of claim 3, wherein the second raw material is supplied to the i-th micromixer for intermediate, and
   the second raw material supplied to the i-th micromixer for intermediate is mixed with the first raw material in the i-th micromixer for intermediate to form the first mixture, and
   the first mixture reacts while passing through the reaction volume, thereby producing the intermediate product.

6. The automated microreactor of claim 1, wherein reaction volumes comprise a volume of the i-th tubular reactor for intermediate, . . . , and a volume of the n-th tubular reactor for intermediate.

7. The automated microreactor of claim 1, wherein the flow rate controllers comprise the first, second, and third raw material flow rate controllers configured to control the flow rates of the first, second, and third raw materials, respectively.

8. The automated microreactor of claim 7, wherein the valve member comprises a first valve, . . . , an i-th valve, . . . , and an n-th valve (n and i are each independently a natural number, and 1≤i≤n), wherein the n valves are connected in parallel and
   the n valves are respectively connected in series to the first micromixer for intermediate, . . . , the i-th micromixer for intermediate, . . . , and the n-th micromixer for intermediate,
   each of the n valves is connected in series to the second raw material flow rate controller, and
   each of the n valves independently opens and closes to allow or block supply of the second raw material to each of the n micromixers for intermediate.

9. The automated microreactor of claim 7, wherein the second raw material comprises a first second-raw material, . . . , a j-th second-raw material, . . . , and an m-th second-raw material (m and j are each independently a natural number, and 1≤j≤m), wherein the first to m-th second-raw materials are different from each other, the second raw material flow rate controller comprises a first second-raw material flow rate controller, . . . , a j-th second-raw material flow rate controller, . . . , and an m-th second-raw material flow rate controller (m and j are each independently a natural number, and 1≤j≤m) that respectively controls the flow rates of the first to m-th second-raw materials, and the valve member comprises a first valve, . . . , a j-th valve, . . . , and an m-th valve (j and m are each independently a natural number, and 1≤j≤m), wherein the m valves are respectively connected in series to the first, . . . , j-th, . . . , and m-th second-raw material flow rate controllers, each of the m valves is connected in series to the intermediate reaction unit, and the m valves each independently opens and closes to allow or prevent that each of the m second-raw materials is supplied to the micromixer for intermediate.

10. The automated microreactor of claim 8, wherein the second raw material comprises a first second-raw material, . . . , a j-th second-raw material, . . . , an m-th second-raw material (m and j are each independently a natural number, and 1≤j≤ m), the second raw material flow rate controller comprises a first second-raw material flow rate controller, . . . , a j-th second-raw material flow rate controller, . . . , an m-th second-raw material flow rate controller (m and j are each independently a natural number, and 1≤j≤m) that respectively controls the flow rates of the first to m-th second-raw materials, and the valve member comprises a first valve, . . . , a j-th valve, . . . , an m-th valve (m and j are each independently a natural number, and 1≤j≤m), wherein the m valves are respectively connected in series to the first, . . . , j-th, . . . , m-th second-raw material flow rate controllers, each of the m valves is connected in series to the n valves, and the m valves each independently opens and closes to allow or prevent that each of the m second-raw materials is supplied to the micromixer for intermediate through each of the n valves.

11. The automated microreactor of claim 10, wherein the valve is a solenoid valve.

12. The automated microreactor of claim 1, wherein the intermediate has a life span in a range of 1 millisecond (ms) to 100 seconds(s).

13. The automated microreactor of claim 1, wherein the micromixer for intermediate has a T shape.

14. The automated microreactor of claim 1, further comprising a temperature control unit that controls a temperature of each of the intermediate reaction unit and the product reaction unit.

15. The automated microreactor of claim 14, further comprising an artificial intelligence unit that controls each of the raw material supply unit, the intermediate reaction unit, the intermediate reaction control unit, the product reaction unit, and the temperature control unit.

16. The automated microreactor of claim 1, wherein the second raw material comprises at least one organolithium compound selected from the group consisting of n-butyllithium, sec-butyllithium, n-hexyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

17. The automated microreactor of claim 1, further comprising an analyzing unit comprising an analyzer to analyze the product generated in the product reaction unit.

18. A method of optimizing a high-speed chemical reaction using an automated microreactor comprising a raw material supply unit, an intermediate reaction unit, an intermediate reaction control unit, and a product reaction unit, the method comprising:

(a) controlling a flow rate of each of a plurality of raw materials comprising first, second, and third raw materials using a plurality of flow rate controllers of the raw material supply unit, respectively and supplying the plurality of raw materials at the controlled flow rates;

(b) producing a first mixture by mixing the first and second raw materials supplied from the raw material supply unit in any one of a plurality of micromixers for intermediate of the intermediate reaction unit, and producing an intermediate product by causing a reaction of the first mixture in at least one of a plurality of tubular reactors for intermediate; and (c) producing a second mixture by mixing the intermediate product supplied from the intermediate reaction unit and the third raw material supplied from the raw material supply unit in a product micromixer of the product reaction unit, and preparing a product, wherein a valve member of the intermediate reaction control unit controls a length of the tubular reactor for intermediate and at least one type of multiple types of the second raw material being supplied.

19. The method of claim 18, wherein the optimization of the high-speed chemical reaction is a method of controlling a reaction time of the first mixture by controlling:

the flow rates of the first and second raw materials controlled with the flow rate controllers; and a reaction volume of the tubular reactor for intermediate with the valve member.

* * * * *